Sept. 16, 1969   JEAN-CLAUDE H. GEORGE   3,467,511

METHOD OF MAKING LIGHT REFLECTORS

Filed Nov. 1, 1963

INVENTOR.
Jean-Claude Henri George
BY
Kenway, Jenney + Hildreth
ATTORNEYS

United States Patent Office

3,467,511
Patented Sept. 16, 1969

3,467,511
METHOD OF MAKING LIGHT REFLECTORS
Jean-Claude Henri George, Paris, France, assignor to Quartz & Silice S.A., Paris, France, a corporation of France
Filed Nov. 1, 1963, Ser. No. 320,708
Int. Cl. C03b *23/20, 33/08;* C03c *17/00*
U.S. Cl. 65—60                                   2 Claims

ABSTRACT OF THE DISCLOSURE

The method of making a mirror comprising the steps of assembling a parallel array of elongated transparent fused silica elements on a block of refractory material, surrounding the array with a retaining element, and fusing together the exposed ends of the elements to form a continuous surface wherein said surface may be provided with a light reflecting coating.

---

Figure 1:
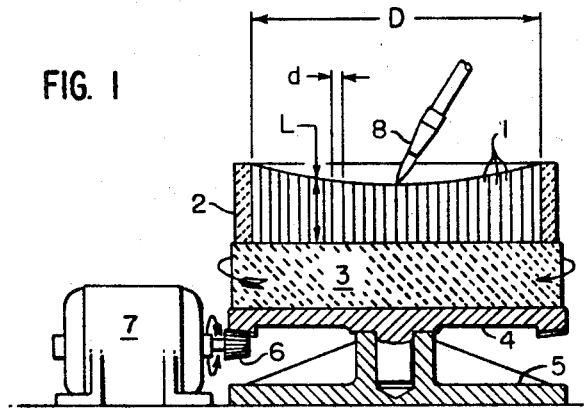

My invention relates to mirror constructions, and particularly to a novel fused silica mirror and the process of manufacturing the same.

It has long been known that fused silica has properties which make it highly desirable for use in the construction of optical mirrors, and particularly for optical mirrors of large dimensions for astronomical work. Specifically, the very low coefficient of thermal expansion of silica makes it especially desirable for manufacturing astronomical mirrors for use in environments characterized by wide variations in temperature, either in land based observatories or in space. However, the customary glass making techniques used in the fabrication of such mirrors, involving melting the material from which the mirror is to be formed, pouring it into a mold and annealing and cooling, are not practical for the manufacture of large silica plates or discs, because of the high melting point of silica and its high viscosity in the molten state. It is the object of my invention to make possible the production of large plates or discs of silica, and in particular to facilitate the production of mirrors of large dimensions.

One prior approach to the manufacture of silica mirrors of large dimensions has involved the production of a composite structure comprising a series of layers. One such construction comprised two layers of opaque silica separated by spaced tubular columns of opaque silica, and a layer of transparent silica on one of the layers of opaque silica, the transparent silica layer being polished and coated with a reflecting layer. Owing to the varying coefficients of thermal expansion of these various components, the result has been that upon variations in temperature, local variations in the surface curvature of the mirror occur which greatly diminish the quality of the images obtained. A further object of my invention is to minimize the effects of temperature variations on the reflecting surface of a large mirror.

Briefly, the process of my invention consists in assembling together a bundle of elongated fused silica elements, which may be in the form of solid rods, hollow tubes, or the like, and melting the ends of the bundle together so as to form two transparent plates of fused silica interconnected by continuous pillars of fused silica which are more or less fritted together intermediate the plates. The resultant construction is strong and of uniform coefficient of expansion. One or both faces of the plate or disc so formed may be ground to a desired mirror surface, and coated with a layer of reflecting material, such as silver or the like, to form a mirror. For very large mirrors, prismatic segments made in the manner just described may be made as units, and then fused together to form an integral mirror construction.

My invention will best be understood by reference to the following detailed description, together with the accompanying drawings, of a preferred embodiment thereof.

Figure 2:
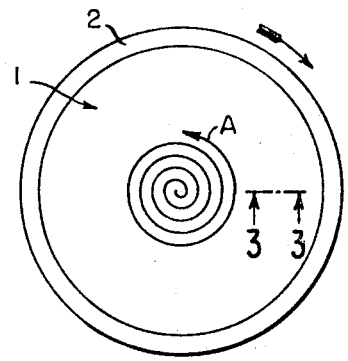
Figure 3:
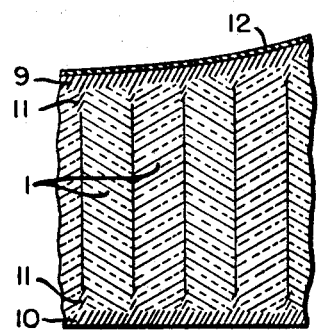
Figure 4:
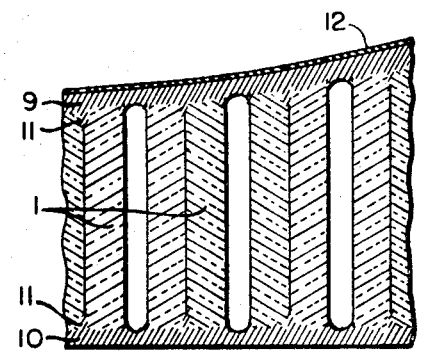
Figure 5:
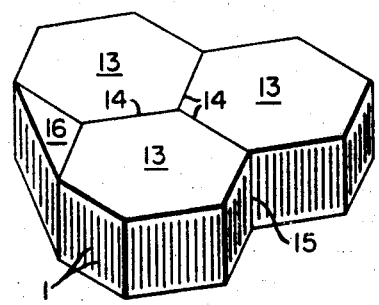

In the drawings,

FIG. 1 is a schematic elevational view, with parts shown in cross-section and parts broken away, illustrating the method of manufacturing a mirror in accordance with my invention;

FIG. 2 comprises a schematic plan view of a portion of the apparatus of FIG. 1, showing the preferred mode of fusing the surface of the elements together;

FIG. 3 comprises a fragmentary cross-sectional view, taken essentially along the lines 3—3 in FIG. 2, and illustrating the internal construction of a mirror in accordance with my invention;

FIG. 4 comprises a schematic fragmentary cross-sectional view similar to that of FIG. 3, but illustrating a modified construction; and FIG. 5 comprises a perspective sketch of a portion of a mirror in accordance with a modified embodiment of my invention especially adapted for use in the production of very large mirrors.

Referring now to the drawings, in FIGS. 1 and 2, I have illustrated quite schematically the preferred method of construction a mirror in accordance with my invention. The process is commenced by assembling together a bundle of elongated fused silica elements 1, which may be from 2 to 20 millimeters in diameter, and which may be of any suitable shape; typically, round solid rods or hollow cylindrical tubes may be employed. The length L of these elements is made somewhat greater than the thickness of the final plate or disc which it is desired to obtain, and the lengths of the individual elements may be graduated from the center, as schematically indicated in FIG. 1, to approximate a concave mirror surface, or the lengths may be greater at the center of the mirror and smaller at the periphery to form a convex surface. Preferably, the lengths L of the elements are on the order of from one-fourth to one-twentieth of the diameter D of the finished mirror. These rods are temporarily held in contiguous relationship by any suitable means, here shown as an encircling band of refractory material 2, and are supported on a refractory block 3, the latter being mounted on a turntable 4 journalled in a suitable stand 5. The turntable 4 may be formed with a beveled gear engaging a mating gear 6 fixed on the output shaft of a constantly rotating motor 7, of conventional construction.

Manually held or otherwise suitably supported above the surface of the rods 1 is a conventional high-temperature torch or blowpipe 8, although a series of such torches, or one or more electric arc torches, may be provided for this purpose if so desired. As indicated in FIG. 2 by the spiralling arrow A, it is preferred to fuse together the upper ends of the elements 1 by means of a spiral motion beginning at the center of the construction and working outwardly. This motion is carried out, either manually or by suitable automatic means, while the bundle is rotated slowly on the support by means of the motor 7 or other suitable means. It will be seen that, owing to the rotation of the turntable, the spiral fusion may be readily obtained by a simple linear movement of the torch or torches radially of the mirror blank. The reason for this step-by-step fusion process is that it is extremely difficult to melt the entire surface of the bundle of elements 1 simultaneously, and I have found that it is equally satisfactory to do so in the manner indicated in FIG. 2.

When the entire upper surface of the bundle of elements 1 has been fused in the manner just described, the mass may be annealed by conventional means employed in the annealing of glasses. The bundle may then be inverted, and the process repeated to form a fused surface by melting together the opposite ends of the elements 1. After a final annealing, the selected surface of the blank so formed may be ground to a desired mirror configuration, and coated with a suitable reflecting material in a coventional manner.

Referring next to FIG. 3, I have depicted in somewhat more detail the internal construction of the mirror formed by the process illustrated in connection with FIGS. 1 and 2. As shown, the individual elements 1 are completely fused together at their ends, to form an upper plate 9 and a lower plate 10 of fused silica interconnected by contiguous pillars 1 of fused silica which are more or less fritted together intermediate their ends as schematically indicated at 11. The depth of the surfaces 9 and 10 may be between a few millimeters and 2 centimeters, being determined by the desired strength of the finished mirror; suitable allowance must be made in this regard for material which will be removed in grinding the finished surface. As indicated, the upper plate 9 may be ground and polished in a desired surface configuration to serve as the base for a reflecting coating 12.

As indicated in FIG. 4, the elements 1 may be of hollow tubular material, which greatly reduces the weight of the finished construction without materially reducing its strength. In general, tubes having relatively thick walls should be employed for this purpose.

The process of mirror construction just described is suitable for the manufacture of mirrors having diameters ranging from about 200 millimeters up to about 4 meters. However, for very large mirrors, I prefer to employ a modified method which greatly reduces the difficulties experienced in assembling the elements and fusing them together. As indicated in FIG. 5, such a mirror may be made of a plurality of prismatic elements 13, which may be, for example, of square cross-section or of the hexagonal cross-section illustrated in FIG. 5. As illustrated, these individual elements 13 may be made up of rods 1 in substantially the manner described in connection with FIGS. 1 and 2 above, by fusing the ends of the bundles of rods 1 together to form opposed surfaces of fused silica. The elements 13 may then be assembled together in desired mirror configuration, using specially shaped prismatic segments such as 16 if desired to make maximum use of the outer surface of the mirror, and then fused together, preferably along lines such as 14 joining the segments and normal to the elements 1. A continuous fused surface may thus be formed on both sides of the mirror, and one or both surfaces may be ground to a desired configuration and coated with reflecting material. In practice, during fusion the whole mass must be held by refractory ring, such as the ring 2 in FIG. 1, to prevent the rods from falling apart, and welding or some fritting may take place along the lines such as 15 joining the elements and parallel with the elements 1 because of the heat transfer occurring during fusion of the surfaces.

As indicated above, transparent fused silica is preferred as the material for use in the mirror of my invention, both because of its exceptionally low and uniform coefficient of expansion, and because it lends itself to the grinding of precision optical surfaces. However, for certain purposes, opaque fused silica may be employed. The primary objection to this material is that it contains bubbles which, during drawing, give rise to voids. These voids trap abrasives, and make finish grinding extremely difficult.

Having thus described my invention, what I claim is:

1. The process of making a light reflector, comprising the steps of assembling a parallel array of contiguous elongated transparent fused silica elements on a block of refractory material, surrounding said array with a refractory retaining member to hold the elements in contact in a predetermined configuration, the exposed ends of said elements lying approximately in a predetermined surface, fusing together the exposed ends of the elements to form a continuous silica surface, and adding a reflecting coating to said surface.

2. The process of making a light reflector, comprising the steps of mounting a plurality of elongated transparent fused silica elements in a contiguous parallel array, fusing together the ends of the elements to form a solid body bounded by opposed fused silica surfaces, and adding a reflecting coating to at least one of said surfaces.

References Cited

FOREIGN PATENTS 1,268,097  6/1961  France.

ROBERT F. BURNETT, Primary Examiner

WILLIAM A. POWELL, Assistant Examiner

U.S. Cl. X.R.

65—36, 59; 117—35; 156—82, 296, 306; 161—4, 42, 69, 139, 178, 179; 350—296